United States Patent

Bichon et al.

[11] Patent Number: 5,826,332
[45] Date of Patent: Oct. 27, 1998

[54] METHOD AND MANUFACTURING A HOLLOW TURBOMACHINE BLADE

[75] Inventors: Mathieu Philippe Albert Bichon, Ermont; Xavier Gérard André Coudray, Fontainebleau; Alex Pierre Deblois, Fontaine Le Comte; Christophe Nicolas Marie Joseph Huon De Kermadec, Versailles; Jean-François Georges Julien Lacuisse, Argenteuil; Bruno André Rolland, Vaucresson, all of France

[73] Assignees: Societe Nationale d'Etude et de Construction de Moteurs d'Aviation; Societe Dassault Aviation, both of Paris, France

[21] Appl. No.: 721,352

[22] Filed: Sep. 26, 1996

[30] Foreign Application Priority Data

Sep. 27, 1995 [FR] France ................... 95.11300

[51] Int. Cl.⁶ ..................................... B23P 15/00
[52] U.S. Cl. ..................... 29/889.72; 29/889.72; 29/889.7; 29/464; 228/118; 228/157
[58] Field of Search .............. 29/889.72, 889.7, 29/889.721, 889.722, 421.1, 464; 228/157, 118

[56] References Cited

U.S. PATENT DOCUMENTS

| | | | |
|---|---|---|---|
| 4,882,823 | 11/1989 | Weisert et al. . | |
| 5,063,662 | 11/1991 | Porter et al. | 29/889.72 |
| 5,083,371 | 1/1992 | Leibfried et al. | 29/889.72 |
| 5,253,419 | 10/1993 | Collot et al. | 29/889.72 |
| 5,269,058 | 12/1993 | Wiggs et al. . | |
| 5,581,882 | 12/1996 | Fowler et al. | 29/889.72 |
| 5,636,440 | 6/1997 | Bichon et al. | 29/889.72 |

FOREIGN PATENT DOCUMENTS

| | | |
|---|---|---|
| 0 500 458 | 8/1992 | European Pat. Off. . |
| 0 549 172 | 6/1993 | European Pat. Off. . |
| 2 261 032 | 5/1993 | United Kingdom . |
| 2 269 555 | 2/1994 | United Kingdom . |

Primary Examiner—Paul T. Sewell
Assistant Examiner—Jila Mohandesi
Attorney, Agent, or Firm—Oblon, Spivak, McClelland, Maier & Neustadt, P.C.

[57] ABSTRACT

A method of manufacturing a hollow machine blade consisting of two skins defining an internal cavity and interconnected by stiffeners comprises:

forging and machining the primary components of the blade, including forming a reserve of material in localized regions of the inner faces of the skins, trunnion forming elements at the ends of the components, and locating holes in the components;

deposition of diffusion barriers involving application of a mask, cutting the mask to a predetermined pattern using a special-purpose tool, peeling away portions of the mask, deposition of a coating product, peeling away the remainder of the mask, prefiring treatment, cleaning and checking;

assembly of the primary components followed by isostatic-pressure diffusion welding; and subjecting the assembly to inflation under gas pressure and superplastic forming in a mould in order to shape the skins and form the interconnecting stiffeners, including the steps of cold-debonding the primary components, causing flow of the material reserved in the overthickness around the blade cavity, and extraction of the blade from the mould by way of mechanical means placing the blade under constraint after the forming of the blade.

11 Claims, 5 Drawing Sheets

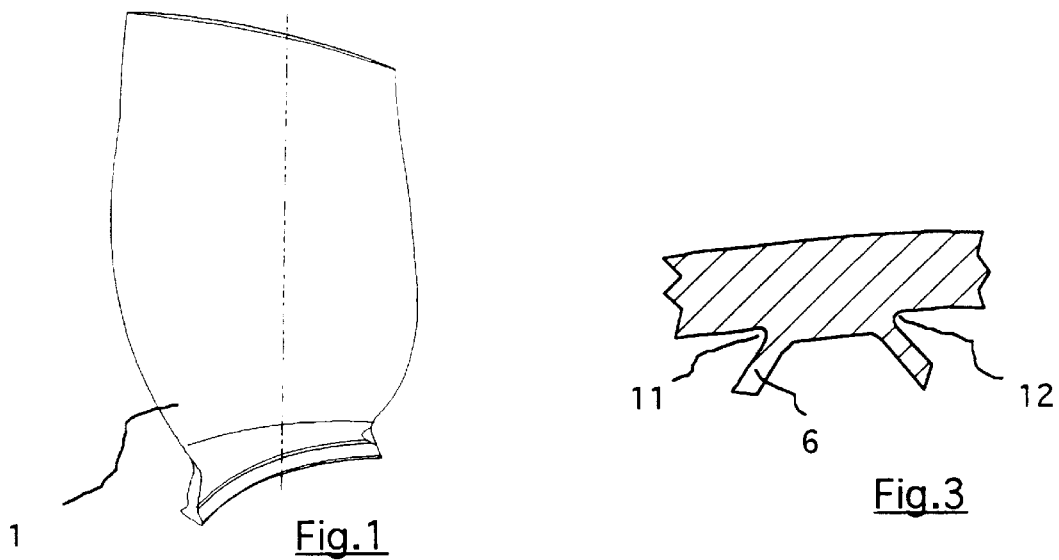
Fig.1
Fig.3
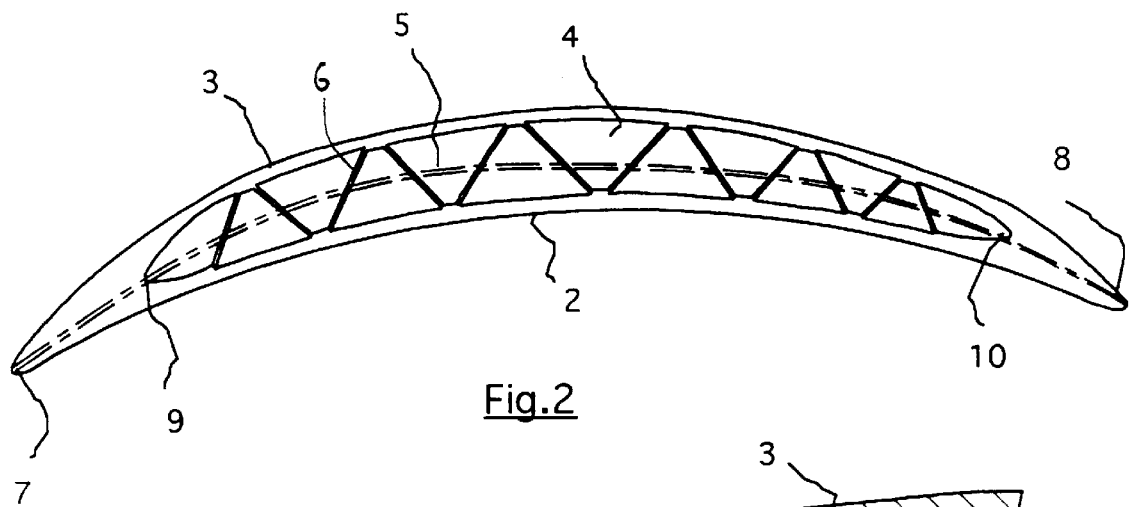
Fig.2
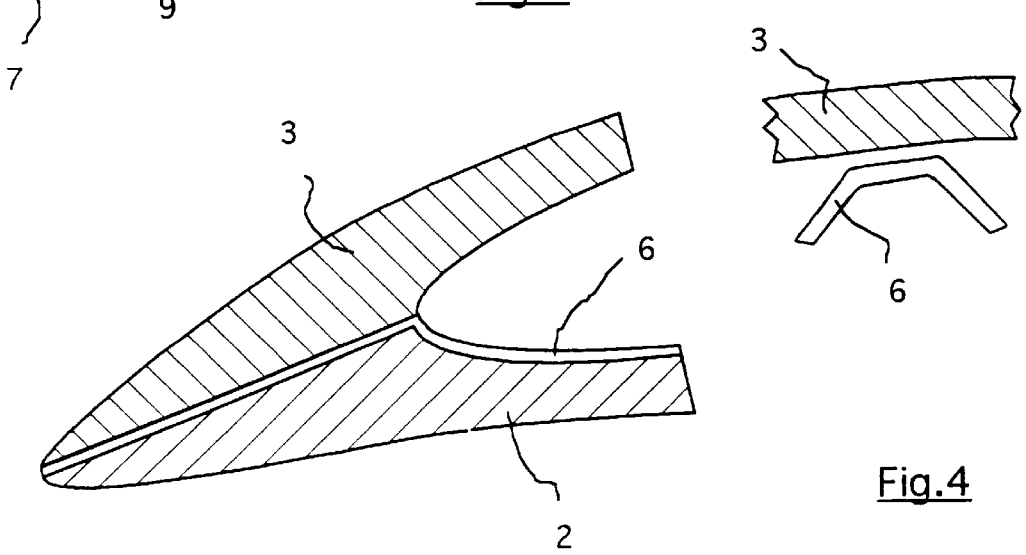
Fig.4

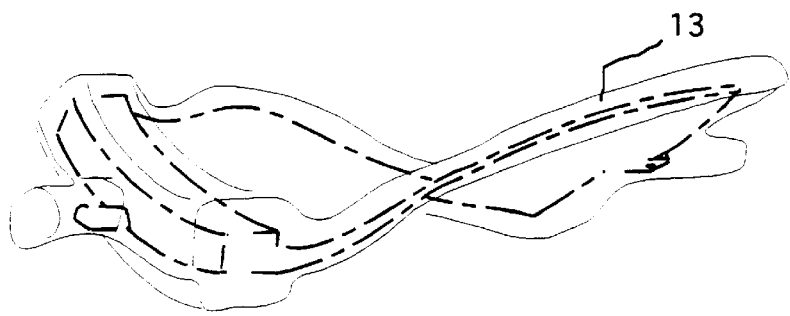
Fig. 5
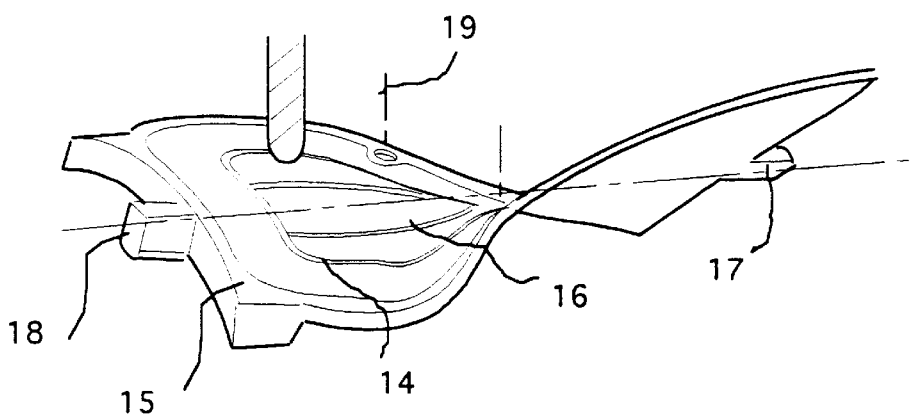
Fig. 6
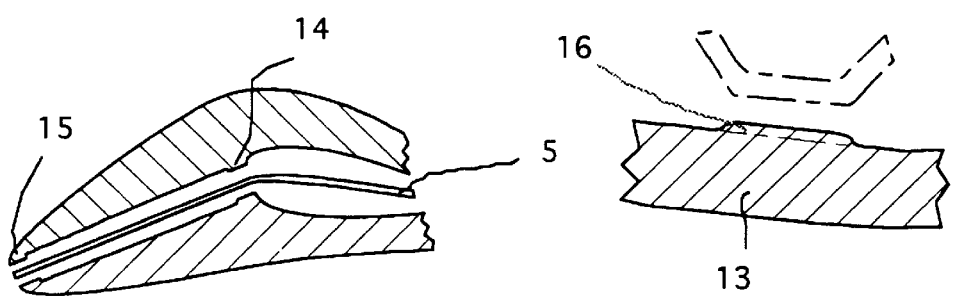
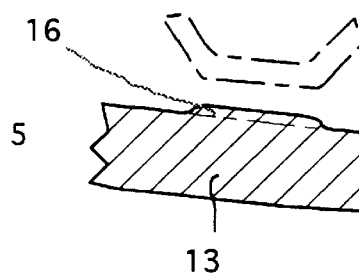
Fig. 7
Fig. 8
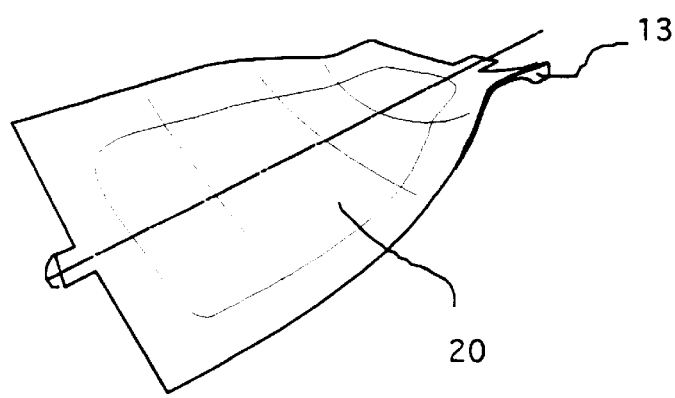
Fig. 9

METHOD AND MANUFACTURING A HOLLOW TURBOMACHINE BLADE

BACKGROUND OF THE INVENTION

1. Field of the Invention

The present invention relates to a method of manufacturing a hollow blade for a turbomachine.

The advantages of using large chord blades in turbomachines are particularly noticeable when used for the blades of the rotor in the fan of a by-pass turbojet engine. These blades have to cope with severe conditions of use and, in particular, must possess satisfactory mechanical characteristics combined with properties of endurance under vibration and resistance to impacts by foreign bodies. The requirement for sufficient speed at the blade tip has, moreover, led to research into reducing the mass of the blades, resulting in particular in the use of hollow blades.

A fan blade has a specific geometry related to the small hub dimensions, which leads to a blade which is highly cambered at its root and has a very flat profile at the blade tip for a compression ratio which is substantially constant over the height of the blade. Moreover, an appropriate geometric shape has to be derived for the transition between the attachment portion of the blade and the aerodynamic vane portion. This leads to a highly three-dimensional geometry on the rear of the profile at its lower part called "spoon", with cambering in the profile direction and a curve in the radial direction.

In order for titanium-alloy hollow fan blades to have good mechanical characteristics, particular care has to be given to the design of the internal geometry of the blades and the quality of manufacture thereof, particularly having regard to:

- formation of an internal transition radius between the pressure face and suction face skins at the leading and trailing edge regions of the blade;
- formation of a transition radius between the internal stiffeners and the pressure face and suction face skins;
- very little thinning in the stiffeners;
- preservation of the mechanical qualities of the base metal when carrying out diffusion welding of excellent quality at all of the skin/stiffener junctions;
- obtaining a surface state of the internal cavities after inflation conforming with the usual requirements for titanium components; and
- optimization of the manufacturing schedule so as not to degrade the intrinsic mechanical characteristics of forged-titanium fan blades.

Moreover, the manufacturing process must allow components to be manufactured having changing geometric parameters (variation in thickness of the skins and stiffeners, variation in the stiffener forming angle, variation in the width of the welded regions, etc.)

The manufactured component must, in effect, be in accordance with the requirements for optimized geometry having good vibratory fatigue resistance, good tolerance to ingestion, and fulfil all the design conditions for the engine lifetime sought.

2. Summary of the Prior Art

One known method of manufacturing a hollow blade for a turbomachine comprises the steps of:

(a) using Computer Aided Design and Manufacture (CADCAM) techniques to design the constituent components of the blade based on the definition of the blade to be obtained;

(b) using a press to forge the primary components comprising a pressure face skin, a suction face skin and at least one central member;

(c) machining said primary components;

(d) depositing diffusion barriers on at least one of said primary components according to a predefined pattern;

(e) assembling said primary components to form a sandwich assembly followed by isostatic-pressure diffusion welding thereof;

(f) inflating said sandwich assembly under gas pressure and superplastic forming said assembly so as to shape said pressure face and suction face skins of the blade, and whereby said skins are separated by a central cavity and linked by welded stiffeners obtained from said central member; and, (g) final machining.

SUMMARY OF THE INVENTION

It is an objection of the invention to improve this known general method by introducing specific features aimed, in particular, at obtaining blades exhibiting satisfactory mechanical characteristics under the conditions of use, by virtue of appropriate geometry, particularly in so far as the production of the cavity of the blade is concerned.

To this end, the invention provides an improvement to the above defined method of manufacturing a hollow blade wherein:

in steps (b) and (c) said primary components are provided with trunnion forming elements at each end, and at least two locating holes are formed in each of said components;

in step (c) said primary components are machined so as to leave spare material in localized regions of the inner faces of said skins;

step (d) comprises the steps of:

(d1) applying an organic-type mask onto at least one face of at least one of said primary components;

(d2) cutting the mask according to a predefined pattern representing the boundaries of the regions to be welded and not to be welded by means of a tool on a numerically controlled machine, adjustment of the position for cutting out the mask allowing control of the position of the welds in the regions corresponding to the junctions at the leading and trailing edges of the blade where a cavity radius is formed, as well as in the regions of the transition radius between said stiffeners and said skins;

(d3) peeling said mask from said regions which are not to be welded;

(d4) cleaning the surfaces of said at least one masked component;

(d5) depositing a coating product forming a diffusion barrier on said cleaned surfaces;

(d6) peeling the remainder of said mask from said at least one masked component;

(d7) prefiring said anti-diffusion barrier coating; and (d8) cleaning and checking the surfaces to be welded;

in step (e) said primary components are assembled using said trunnion elements at the ends thereof and lateral positioning pins placed in said locating holes; and in step (f), forming pressure is applied in a predetermined cycle including:

(f1) cold-debonding said primary components before starting said inflation;

(f2) closing a shaping mold around said sandwich assembly and causing said spare material provided as an overthickness around the cavity of the blade to flow before said inflation; and (f3) after forming, extracting the blade from said mold at the forming temperature using mechanical means placing said blade under constraint.

The present invention makes it possible to obtain an internal geometry providing the properties sought for the blade, and particularly regarding:

the overall geometry of the blade section, principally concerning the number, the shape and the position of the stiffeners, as well as the position and the width of the cavity; and the local geometry, principally at the skin-stiffener connections and cavity start welding boundaries. By convention, we will not differentiate the cavity radius at the leading edge and that at the trailing edge, which will be called the cavity radius. Likewise, we will not dissociate the skin stiffener connection radii whatever their position and we will call them the skin/stiffener start radius.

Preferred features and advantages of the invention will become apparent from the following description of the preferred embodiments of the invention with reference to the attached drawings.

BRIEF DESCRIPTION OF THE DRAWINGS

FIG. 1 represents a face view of one example of a hollow turbomachine blade obtained by a method in accordance with the invention;

FIG. 2 represents a diagrammatic transverse sectional view through the blade represented in FIG. 1;

FIG. 3 shows a detail of a connection between two components of the blade represented in FIGS. 1 and 2;

FIG. 4 represents a partial view showing details of the construction of the blade represented in FIGS. 1 and 2;

FIG. 5 is a diagrammatic perspective view of a blank component used in the method in accordance with the invention;

FIG. 6 is a diagrammatic perspective view of a constituent component of a blade represented in FIGS. 1 and 2 at the machining stage;

FIGS. 7 and 8 are sectional views representing parts of the primary components of the blade shown in FIGS. 1 and 2, showing overthicknesses formed at the machining stage;

FIG. 9 is a perspective view of a component of the blade represented in FIGS. 1 and 2, showing a mask being put in place;

DESCRIPTION OF THE PREFERRED EMBODIMENTS

Figure 10:
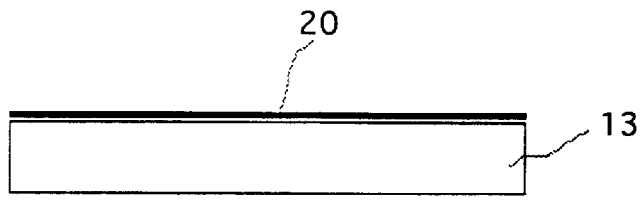
FIG. 10 is a diagrammatic sectional view of the component shown in FIG. 9.

A hollow blade 1 for a turbomachine, specifically a large-chord fan blade for a bypass turbojet engine, is represented diagrammatically in FIGS. 1 and 2. The blade 1 consists of a pressure face skin 2 and a suction face skin 3 which are spaced apart to form an internal cavity 4, and an element 5 arranged between the skins 2, 3 and forming multiple stiffeners 6 which interconnect the two skins. In the blade 1 obtained by the manufacturing method of the invention, the two skins 2 and 3 are welded along their edges to form a leading edge 7 and a trailing edge 8, and the cavity 4 of the blade 1 has a radius 9 on the leading edge side and a radius 10 on the trailing edge side. Also, the element 5 includes welded regions, some to the pressure face skin 2 and the others to the suction face skin 3, and the junctions between the stiffeners 6 and the skins 2 and 3 form radii 11 and 12 as shown diagrammatically in FIG. 3.

The first stage (a) of the method in accordance with invention for manufacturing a hollow blade 1 for a turbomachine includes a study and analysis of a drawing of the finished blade using facilities known as Computer-Aided Design and Manufacture, or CADCAM. This study makes it possible to simulate deflation of the suction face skin 3 and the construction of the central sheet metal element 5 so as to make these two elements rest against the pressure face sheet or to place them at a known distance therefrom. The simulation software used makes it possible to predict the relative movement of the metal sheets during the forming, and in order to obtain the designated geometry, each constituent element of the blade, referred to as the primary components 2, 3 and 5, is designed to have overthicknesses compatible with the forging process, as shown diagrammatically in FIG. 4.

FIG. 5 shows the blanks 13 from which the primary components 2, 3 and 5 of the blade, with their overthicknesses, are machined, the blanks being obtained by forging and stamping using a press in step (b) of the method in accordance with the invention.

In step (c), the blanks 13 are machined, as represented in FIG. 6. The finish of the internal surfaces defined by the primary components may be produced by any known machining process. At this stage, an overthickness of material is advantageously formed on the primary skin components around the entire periphery of that region of the skin components intended to form the blade cavity. This overthickness part 14 constitutes a flow region intended subsequently to be plastically defomed. An overthickness part 15 is also formed on the periphery of at least one of the components to ensure spacing between the components on assembly thereof. FIG. 7 shows a detail of these overthicknesses 14 and 15.

Preferably, localized overthicknesses defining flat surfaces 16 are also formed in step (c) on the inner surfaces of the primary skin components in the regions where the welds for connecting the stiffeners to the skins are to be located, as shown diagrammatically in FIG. 8.

The primary components include trunnion portions 17 and 18 at each end for use during subsequent stages of the method. Moreover, at least two locating holes 19 are machined in each of the primary components. Advantageously, the machining operation can be carried out on suction tooling so as to ensure the required precision in the positioning of the cavity regions with respect to one another. These precautions are essential to obtain the appropriate cavity radii.

Figure 11:
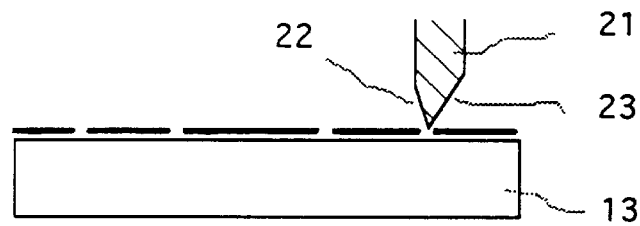
FIG. 11 is a diagrammatic view similar to that of FIG. 10, showing the component at the stage of cutting the mask.

In step (d), diffusion barriers are deposited according to a predefined pattern. In more detail, this step involves the following initial sub-steps:

(d1) application of an organic-type mask 20 to at least one face of at least one of the primary components 13, as represented in FIGS. 9 and 10; and (d2) cutting the mask 20 according to a predefined pattern representing the boundaries of regions which are to be welded and regions which are not to be welded, as FIG. 11 shows diagrammatically. The use of a special-purpose tool on a numerically controlled machine allows precise adjustment of the position in which the mask is cut.

The cutting can also be carried out using a cutting disc 21 having asymmetric flanks 22 and 23, such as shown in FIG. 11, on a numerically controlled machine. The particular shape of the cutting disc 21 and judicious setting of the tool pressure ensures high cutting precision.

The cutting operation may also be carried out by means of a scalpel servocontrolled by an electropneumatic system so as to ensure a clean cut without causing damage to the primary component.

Depending on the specific application, low-power laser machining may also be used to obtain a clean cut without causing damage to the primary component.

Figure 12:
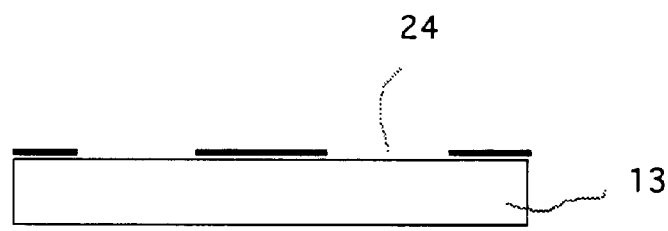
FIG. 12 is a diagrammatic view similar to that of FIGS. 10 and 11, showing the component at the stage of peeling off part of the mask.

A sub-step (d3) then follows in which the mask is peeled from the not to be welded regions 24, as shown diagrammatically in FIG. 12.

Figure 13:
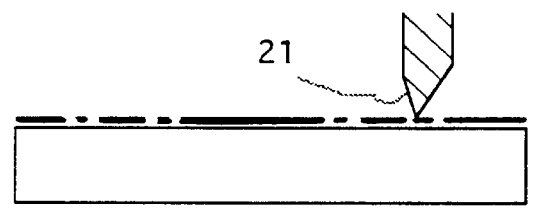
FIG. 13 is a diagrammatic view similar to those of FIGS. 10 to 12, showing the component in a variant of the mask cutting stage.
Figure 14:
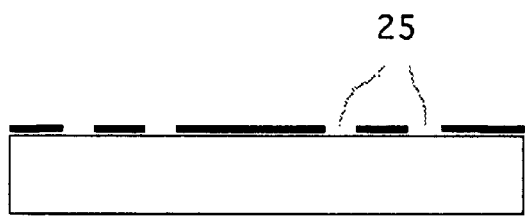
FIG. 14 is a diagrammatic view similar to that of FIGS. 10 to 13, showing the component of FIG. 13 at the stage of peeling off portions of the mask.
Figure 15:
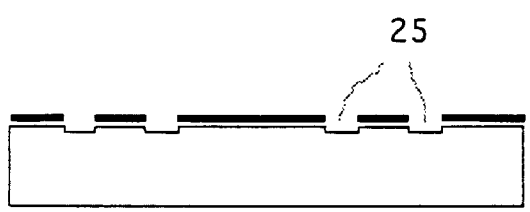
FIG. 15 is a diagrammatic view similar to that of FIGS. 10 to 14, showing the component of FIGS. 13 and 14 at the stage of chemically machining grooves.
Figure 16:
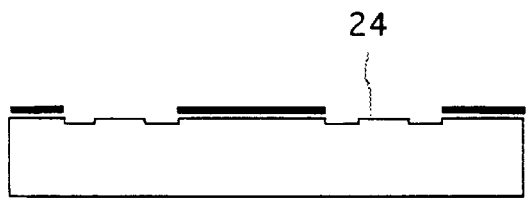
FIG. 16 is a diagrammatic view similar to that of FIGS. 10 to 15, showing the component of FIGS. 13 to 15 at the stage of peeling off further portions of the mask.

In a variant, the cutting of the mask 20 also defines regions 25 which are to be grooved according to a predefined pattern adjacent and parallel to the welded regions, as FIG. 13 shows diagrammatically; the mask is peeled from the regions 25 to be grooved as shown diagrammatically in FIG. 14; grooves are chemically machined in the uncovered regions 25 as shown diagrammatically in FIG. 15; and the mask is peeled from the regions 24 which are not to be welded between the grooves 25 as shown diagrammatically in FIG. 16.

Figure 17:
FIG. 17 is a diagrammatic view similar to that of FIGS. 10 to 16, showing the component of FIG. 12 in a variant involving chemical machining of the uncovered surfaces.
Figure 18:
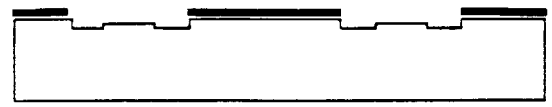
FIG. 18 is a diagrammatic view similar to that of FIGS. 10 to 17 showing the component of FIG. 17 in a further variant involving the production of grooved regions.

Another variant involves chemical machining, for example to a maximum depth of 0.75 mm, so as to create a clean edge at the cutting border, as shown diagrammatically in FIG. 17 showing the regions 24, or in FIG. 18 including the grooved regions 25.

After the sub-step (d3), further sub-steps are carried out as follows:

(d4) The surfaces of the component are cleaned.

Figure 19:
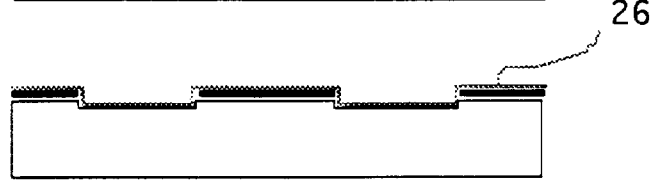
FIGS. 19 and 20 are diagrammatic views similar to those of FIGS. 10 to 18, respectively showing the components of FIGS. 17 and 18 at the stage of deposition of a diffusion barrier.
Figure 20:

(d5) A coating product 26 forming a diffusion barrier is deposited on the prepared surfaces, as indicated in FIG. 19 or 20. The product is deposited by spraying in successive layers to a thickness possibly reaching 40 μm, each layer being dried before the next application.

Figure 21:
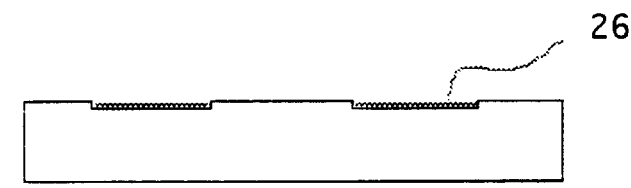
FIGS. 21 and 22 are diagrammatic views similar to those of FIGS. 10 to 20, respectively showing the components of FIGS. 19 and 20 at the stage of peeling off the remainder of the mask.
Figure 22:
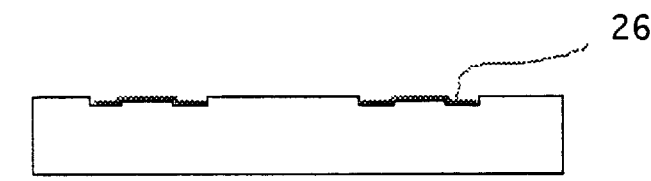

(d6) The remaining portions of the mask are then peeled off, the component being kept in a position which avoids any antidiffusion material falling back onto the regions which are to be welded. The result obtained is shown diagrammatically in FIGS. 21 or 22 depending on whether grooves are present.

(d7) A prefiring treatment is applied to the anti-diffusion coating. The temperature of this treatment is chosen to be between 250° C. and 350° C. for a predetermined time in order to ensure a level of degradation of the major part of the binder contained in the anti-diffusion material compatible with the remainder of the operations, and in such a way as to avoid any oxidation of the components, the treatment taking place in the absence of air.

(d8) The regions to be welded are then cleaned and carefully checked, for example under ultraviolet light.

Figure 23:
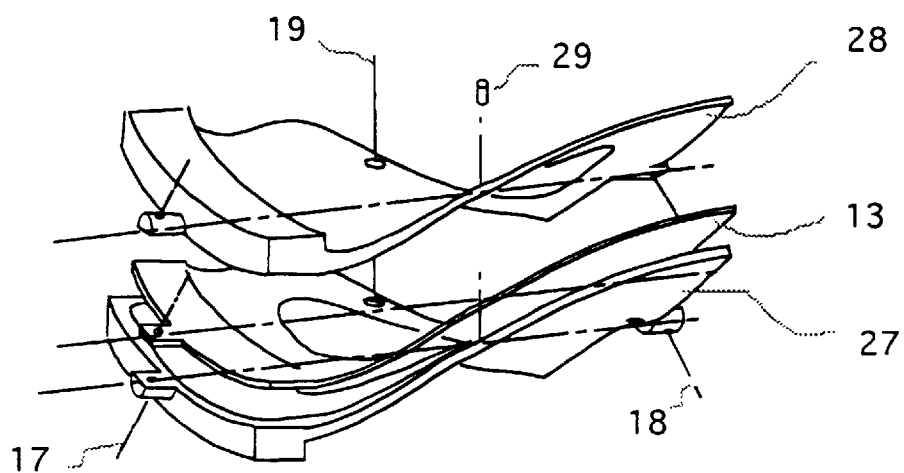
FIG. 23 is a perspective view representing the step of assembling the primary components constituting the blade.

In the next step (e), the primary components 13, 27, 28 constituting the blade are aligned as shown in FIG. 23, and are assembled using the trunnions 17 and 18 and by placing lateral positioning pins 29 in the aligned holes 19 formed in the components. The method of assembly used makes it possible to obtain perfect alignment of the components and of the face to face regions intended for forming the internal cavities of the blade, and, in particular, makes it possible to obtain the appropriate value for the cavity radius.

Figure 24:
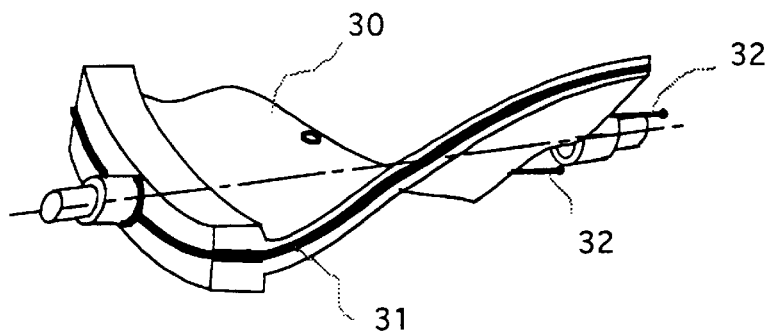
FIG. 24 is a perspective view showing the completion of the assembly of components shown in FIG. 23.

FIG. 24 shows diagrammatically the completion of this assembly. The periphery of the sandwich 30 obtained is closed, for example by means of a weld 31 formed using a TIG arc, an electron beam, or a laser. Tubes 32 are welded into each end, and a vacuum is produced via these tubes 32 uniformly within the sandwich 30 and is then maintained by sealing the tubes 32. The presence of the overthickness 15 at the periphery of each of the pressure face 28 and suction face 27 skins makes it possible to maintain a space between the constituent components of the blade during assembly.

In a variant, following the assembly of the sandwich 30, it is possible to carry out firing of the diffusion barrier put in place in the preceding step (d).

Figure 25:
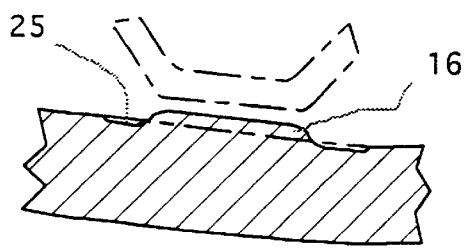
FIGS. 25 and 26 are diagrammatic sectional views showing details of alternative embodiments in which flat surfaces are formed in the regions of the connections between components of the blade.
Figure 26:
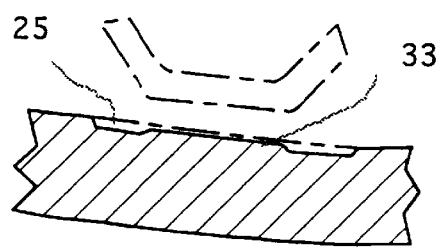

After assembly, the sandwich 30 is diffusion welded together in an isostatic compression chamber, so as to ensure intimate contact of the components 13, 27 and 28 constituting the blade. In the course of this operation, movements induced during the pressurization, which places the internal surfaces into contact with each other, may, by friction, entail the shifting and/or deterioration of the boundaries of the diffusion barriers. The arrangements shown in FIGS. 25 and 26 are designed to avoid this, showing in one case the provision of positive flat regions 16 bounded by lateral grooves 25 and, in the other case the provision of negative flat regions 33 and lateral grooves 25, on the primary components in the regions intended to be welded to form the joints between stiffeners and skins as represented in FIG. 3.

The presence of the grooves 25 protects the integrity of the diffusion barrier boundaries on the constituent components of the blade, by placing the boundaries below the level of the weld plane. The presence of a space between the constituent components of the blade after assembly, by virtue of the overthickness 15 as previously described with reference to FIG. 6, performs the function of an impurity trap during the diffusion welding operation. Defects possibly resulting therefrom are then localized in regions intended to be discarded.

Figure 27:
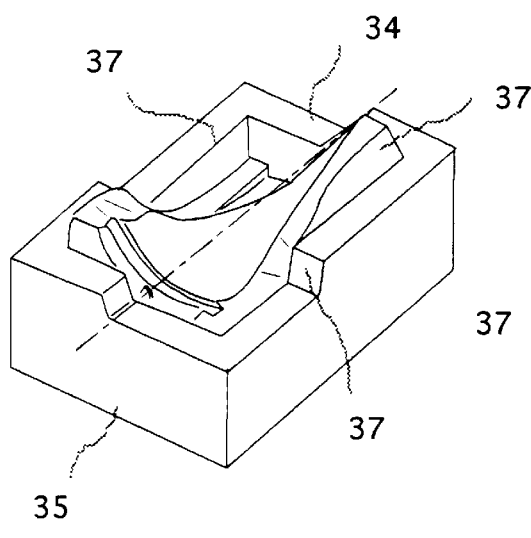
FIG. 27 is a diagrammatic perspective view showing the two parts of the mold used in the step of superplastic forming of the blade.
Figure 27:
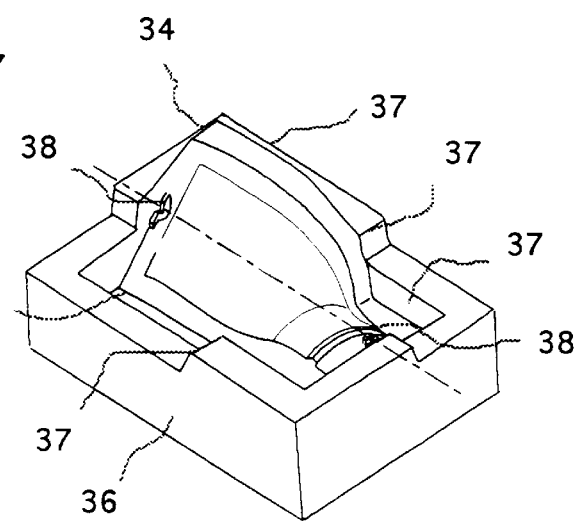

At the following step (f), forming of the components constituting the blade 1 is carried out under super-plastic conditions, by applying inflation pressure to the internal cavity 4 in such a way as to obtain, as shown diagrammatically in FIG. 2, the desired profile for the aerodynamic surfaces of the blade on the pressure face side 2 and on the suction face side 3, and also the formation of the stiffeners 6 from the central primary component 13. To this end, the sandwich 30 is placed in a mold 34 represented diagrammatically in FIG. 27. The mold 34 is in two parts 35 and 36 and its characteristics make it possible to ensure precise relative positioning of the two parts 35 and 36 in the six degrees of freedom. In particular, the mold 34 has antirotation stops 37 positioned so that, in conjunction with the means for closing the mold, it is possible to ensure that the parts 35 and 36 are locked against relative horizontal rotation and translation from the start of the forming cycle. Centering Vs 38 in the lower mold part 35, in line with the trunnions 17 and 18 at the ends of the blade component assembly, ensure appropriate positioning of the assembly in the mold 34. By virtue of this strict positioning of the blade assembly in the mold 34, any shifting of the blade is avoided, particularly lateral displacement which would have the effect of squeezing the cavity radii 9 and 10. These positioning characteristics of the mold and of the blade assembly thus contribute to obtaining the dimensions and shapes desired for the blade cavity start radii in the finished blade.

Figure 28:
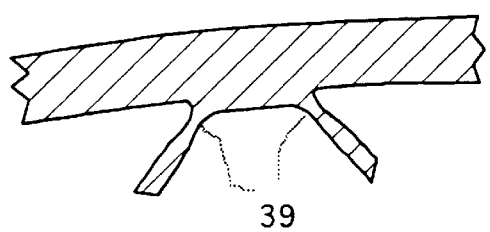
FIG. 28 is a view similar to that of FIG. 3 but showing an example of a defect in the manufacture of the blades.

Before starting the inflation and the forming operation proper, a sub-step is carried out to effect cold debonding of the primary components of the assembly, this being made necessary by the state of compaction of the diffusion barriers. A predetermined cycle of forming pressurization, including mechanical pressurization, is then applied from the start of the inflation, so as to ensure an absence of defects in the finished blade. Servocontrol is preferably used for the clamping pressure of the mold and the inflation pressure. As part of the cycle, after closure of the mold 34 the localized over-thickness 14 around the region which is to define the blade cavity is made to flow. A controlled sequencing of the successive phases, flow then inflation, makes it possible simultaneously to generate the internal geometry of the blade and to avoid skin defects in line with the cavity starts. During the forming, the cycle defined for application of the internal gas pressure preferably follows a controlled deformation speed, in such a way as to obtain the cavity radii, the radii in the joint regions between skins and stiffeners, and the required radius surface condition as well as the absence of thinning of the stiffeners. FIG. 28 illustrates an example of a thinning defect 39 in a stiffener which is avoided by the method in accordance with the invention. Governing the rate of deformation obtained by virtue of the mold positioning characteristics and the application of the forming cycle makes it possible to ensure the values required for the radii, 9, 10, 11 and 12.

After forming, the blade 1 is extracted from the mold 34 by a mechanical means placing the blade under constraint which maintains the geometry of the piece during this operation, which is carried out while maintaining the forming temperature.

The final step (g) comprises the final machining and finishing of the blade, in a manner which is known.

The particular embodiments of the method in accordance with the invention for manufacturing a hollow turbomachine blade 1 which have just been described ensure that the desired results are obtained, and ensure, in particular, the technical quality of the blade 1. Although already described, the principal results can be briefly stated as follows:

- obtaining the desired values for the cavity start radii 9 and 10 and the weld start radius in the joint regions between the skins 2 and 3 and the stiffeners 6;
- appropriate positioning of the weld line in the above mentioned regions at the cavity radii and at the radii between skins and stiffeners;
- metallurgical quality of the base metal in the above mentioned regions;
- appropriate surface conditions in the cavity start radii 9 and 10 of the blade;
- straightness and cleanness of the weld starts between skins and stiffeners;
- straightness and absence of thinning of the stiffeners 6; and,
- quality of the external geometry of the blade 1, particularly concerning the shape of the profile, the twist, the camber and the axial offset.

We claim:

1. In a method of manufacturing a hollow blade for a turbomachine, particularly a large chord fan rotor blade, including the steps of:

(a) using Computer Aided Design and Manufacture (CADCAM) techniques to design the constituent components of the blade based on the definition of the blade to be obtained;

(b) using a press to forge the primary components comprising a pressure face skin, a suction face skin and at least one central member;

(c) machining said primary components;

(d) depositing diffusion barriers on at least one of said primary components according to a predefined pattern;

(e) assembling said primary components to form a sandwich assembly followed by isostatic-pressure diffusion welding thereof;

(f) inflating said sandwich assembly under gas pressure and superplastic forming said assembly so as to shape said pressure face and suction face skins of the blade, and whereby said skins are separated by a central cavity and linked by welded stiffeners obtained from said central member; and, (g) final machining;

the improvement wherein;

in steps (b) and (c) said primary components are provided with trunnion forming elements at each end, and at least two locating holes are formed in each of said components;

in step (c) said primary components are machined so as to leave spare material in localized regions of the inner faces of said skins;

step (d) comprises the steps of:

(d1) applying an organic-type mask onto at least one face of at least one of said primary components;

(d2) cutting the mask according to a predefined pattern representing the boundaries of the regions to be welded and not to be welded by means of a tool on a numerically controlled machine, adjustment of the position for cutting out the mask allowing control of the position of the welds in the regions corresponding to the junctions at the leading and trailing edges of the blade where a cavity radius is formed, as well as in the regions of the transition radius between said stiffeners and said skins;

(d3) peeling said mask from said regions which are not to be welded;

(d4) cleaning the surfaces of said at least one masked component;

(d5) depositing a coating product forming a diffusion barrier on said cleaned surfaces;

(d6) peeling the remainder of said mask from said at least one masked component;

(d7) prefiring said anti-diffusion barrier coating; and (d8) cleaning and checking the surfaces to be welded;

in step (e) said primary components are assembled using said trunnion elements at the ends thereof and lateral positioning pins placed in said locating holes; and in step (f), forming pressure is applied in a predetermined cycle including:

(f1) cold-debonding said primary components before starting said inflation;

(f2) closing a shaping mold around said sandwich assembly and causing said spare material provided as an overthickness around the cavity of the blade to flow before said inflation; and (f3) after forming, extracting the blade from said mold at the forming temperature using mechanical means placing said blade under constraint.

2. A method as claimed in claim 1, wherein said tool used in step (d2) is a cutting disc having asymmetric flanks so that the shape of the cutting disc and the setting of the tool pressure provide high cutting precision.

3. A method as claimed in claim 1, wherein said tool used in step (d2) is a scalpel servo-controlled by an electropneumatic system so as to provide a clean cut without causing damage to the primary component.

4. A method as claimed in claim 1, wherein cutting of the mask is carried out in step (d2) by means of low-power laser machining providing a clean cut without causing damage to the primary component.

5. A method as claimed in claim 1, wherein the cutting of said mask in step (d2) also defines regions to be grooved adjacent said regions to be welded and within said regions not to be welded, and step (d3) comprises:

(d3.1) peeling said mask from said regions to be grooved;

(d3.2) chemically machining grooves in said regions to be grooved; and (d3.3) peeling the mask from the remainder of said regions not to be welded.

6. A method as claimed in claim 1, wherein step (d3) is preceded by the following sub-steps:

(d2.1) peeling said mask from said regions to be welded;

(d2.2) chemically machining the uncovered regions; and (d2.3) re-applying a mask to said regions to be welded.

7. A method as claimed in claim 1, wherein step (c) provides an overthickness of material around the entire periphery of that region of said skins intended to form the blade cavity, said overthickness constituting a flow region which is plastically deformed in step (f).

8. A method as claimed in claim 1, wherein step (c) provides localized overthicknesses on the inner faces of said skins in the regions where the welds for connecting said stiffeners to said skins are to be located, said overthicknesses defining flat surfaces.

9. A method as claimed in claim 1, wherein step (e) includes closing and sealing the periphery of said sandwich assembly, and welding tubes to the end of said assembly to provide access to the interior thereof.

10. A method as claimed in claim 9, wherein the closure of said sandwich assembly is effected by TIG or energy-beam welding.

11. A method as claimed in claim 1, including a step of firing said product forming said diffusion barriers following the assembly of said sandwich.

* * * * *